US008081690B2

(12) United States Patent
Ma et al.

(10) Patent No.: US 8,081,690 B2
(45) Date of Patent: Dec. 20, 2011

(54) OFDM CHANNEL ESTIMATION (75) Inventors: Xiaoqiang Ma, Streamwood, IL (US); Azzedine Touzni, Algonquin, IL (US)

(73) Assignee: QUALCOMM Incorporated, San Diego, CA (US)

( * ) Notice: Subject to any disclaimer, the term of this patent is extended or adjusted under 35 U.S.C. 154(b) by 758 days.

(21) Appl. No.: 12/013,400

(22) Filed: Jan. 11, 2008

(65) Prior Publication Data

US 2009/0180558 A1 Jul. 16, 2009

(51) Int. Cl.
H04K 1/10 (2006.01)
H04L 27/28 (2006.01)
(52) U.S. Cl. ........................ 375/260; 375/259
(58) Field of Classification Search .................. 375/260
See application file for complete search history.

(56) References Cited

U.S. PATENT DOCUMENTS

| | | | | |
|---|---|---|---|---|
| 6,330,293 | B1 * | 12/2001 | Klank et al. | 375/344 |
| 7,453,793 | B1 * | 11/2008 | Jones et al. | 370/203 |
| 2004/0264561 | A1 * | 12/2004 | Alexander et al. | 375/232 |
| 2005/0105593 | A1 * | 5/2005 | Dateki et al. | 375/130 |
| 2006/0133529 | A1 * | 6/2006 | Lee et al. | 375/260 |
| 2007/0098090 | A1 | 5/2007 | Ma et al. | |
| 2007/0211747 | A1 * | 9/2007 | Kim | 370/437 |
| 2007/0268976 | A1 * | 11/2007 | Brink et al. | 375/260 |
| 2008/0152018 | A1 * | 6/2008 | Ma et al. | 375/240.28 |
| 2008/0219371 | A1 * | 9/2008 | Hong et al. | 375/260 |
| 2009/0086841 | A1 * | 4/2009 | Guo et al. | 375/267 |
| 2009/0103666 | A1 * | 4/2009 | Zhao et al. | 375/341 |
| 2010/0002817 | A1 * | 1/2010 | Vrcelj et al. | 375/354 |
| 2010/0034302 | A1 * | 2/2010 | Filippi et al. | 375/260 |

OTHER PUBLICATIONS

Athaudage et al., "Enhanced MMSE Channel Estimation Using Timing Error Statistics for Wireless OFDM Systems", IEEE Transactions on Broadcasting, 50(4):369-376, (Dec. 2004).

Chen et al., "Intercarrier Interference Suppression and Channel Estimating for OFDM Systems in Time-Varying Frequency-Selective Fading Channels", IEEE Transactions on Consumer Electronics, 50(2):429-435, (May 2004).
Choi et al., "On Channel Estimation and Detection for Multicarrier Signals in Fast and Selective Rayleigh Fading Channels", IEEE Transactions on Communications, 49(8):1373-1387, (Aug. 2001).
Edfors et al., "OFDM Channel Estimation by Singular Value Decomposition", IEEE Transactions on Communications, 46(7):931-939, (Jul. 1998).
European Telecommunications Standards Institute, "Digital Video Broadcasting (DVB); Transmission System for Handheld Terminals (DVB-H)", ETSI EN 302 304 V1.1.1, (Nov. 2004).
Fischer et al., "ICI Reduction Method of OFDM Systems", 8th International OFDM-Workshop 2003 (InOWo'03).

(Continued)

*Primary Examiner* — David C. Payne
*Assistant Examiner* — Erin File
(74) *Attorney, Agent, or Firm* — Charles Chesney (57) ABSTRACT

A receiver for receiving an orthogonal frequency division multiplexed (OFDM) digital video broadcast (DVB) signal including OFDM symbol sets including data symbols and pilot symbols transmitted using a plurality of sub-carriers, the OFDM DVB signal being transmitted toward the receiver via a transmission channel, the receiver including an input processor configured to receive the OFDM DVB signal via the transmission channel and to perform a Fourier transform on the OFDM DVB signal to provide a frequency-domain signal, a channel estimation processor coupled to the input processor and configured to calculate final channel estimates, the channel estimation processor being configured to perform time-domain prediction on the frequency-domain signal to provide established sub-carriers that each have corresponding initial channel estimates, and perform minimum mean square error (MMSE) equalization on the frequency-domain signal using the initial channel estimates that correspond to a sub-set of the established sub-carriers to calculate the final channel estimates.

40 Claims, 5 Drawing Sheets

OTHER PUBLICATIONS

Gorokhov, "Robust OFDM Receiers for Dispersive Time-Varying Channels: Equalization and Channel Acquisition", IEEE Transactions on Communications, 52(4):572-583, (Apr. 2004).

Hoeher et al., "Two-Dimensional Pilot-Symbol-Aided Channel Estimation by Wiener Filtering", ICASSP 1997, 3:1845-1848, (Apr. 1997).

Jeon et al., "An Equalization Technique for Orthogonal Frequency-Division Multiplexing Systems in Time-Variant Multipath Channels", IEEE Transactions on Communications, 47(1):27-32, (Jan. 1999).

Li et al., "A Low-Complexity Equalization Technique for OFDM Systems in Time-Variant Multipath Channels", VTC 2003-Fall, 4:2466-2470, (Oct. 2003).

Li et al., "Robust Channel Estimation for OFDM Systems With Rapid Dispersive Fading Channels", IEEE Transactions on Communications, 46(7):902-915, (Jul. 1998).

Mostifi et al., "ICI Mitigation for Mobile OFDM Receivers", ICC 2003, 5:3351-3355, (May 2003).

Necker et al., "An Adaptive Wiener-Filter for Improved Channel Estimation in Mobile OFDM-Systems", IEEE International Symposium on Signal Processing and Information Technology, ISSOIT 2001, pp. 213-216, (Cairo, 2001).

Schniter, "Low-Complexity Equalization of OFDM in Doubly Selective Channels", IEEE Transactions on Signal Processing, 52(4):1002-1011, (Apr. 2004).

Schober et al., "Adaptive Channel Estimation for OFDM Based Hih Speed Mobile Communication Systems", 2001 International Conference on Third Generation Wireless and Beyond, pp. 392-397, (2001).

Song et al., "Pilot-Symbol Aided Channel Estimation for OFDM with Fast Fading Channels", IEEE Transactions on Broadcasting, 49(4):398-402, (Dec. 2003).

Stamoulis et al., "Intercarrier Interference in MIMO OFDM", IEEE Transactions on Signal Processing, 50(10):2451-2464, (Oct. 2002).

Tomasin et al., "Iterative Interference Cancellation and Channel Estimation for Mobile OFDM", IEEE Transactions on Wireless Communications, 4(1):238-245, (Jan. 2005).

* cited by examiner

OFDM CHANNEL ESTIMATION

BACKGROUND

Today, many forms of information are sent from sources, such as television content providers, to receivers, such as televisions in people's homes. An example of such information is digital television (DTV) information. Transmitting digital information typically involves converting the digital information to an analog signal, modulating an RF (radio frequency) carrier frequency's amplitude and/or phase using the analog signal, and sending the modulated signal over a propagation medium, such as air, towards a receiver.

Figure 1:
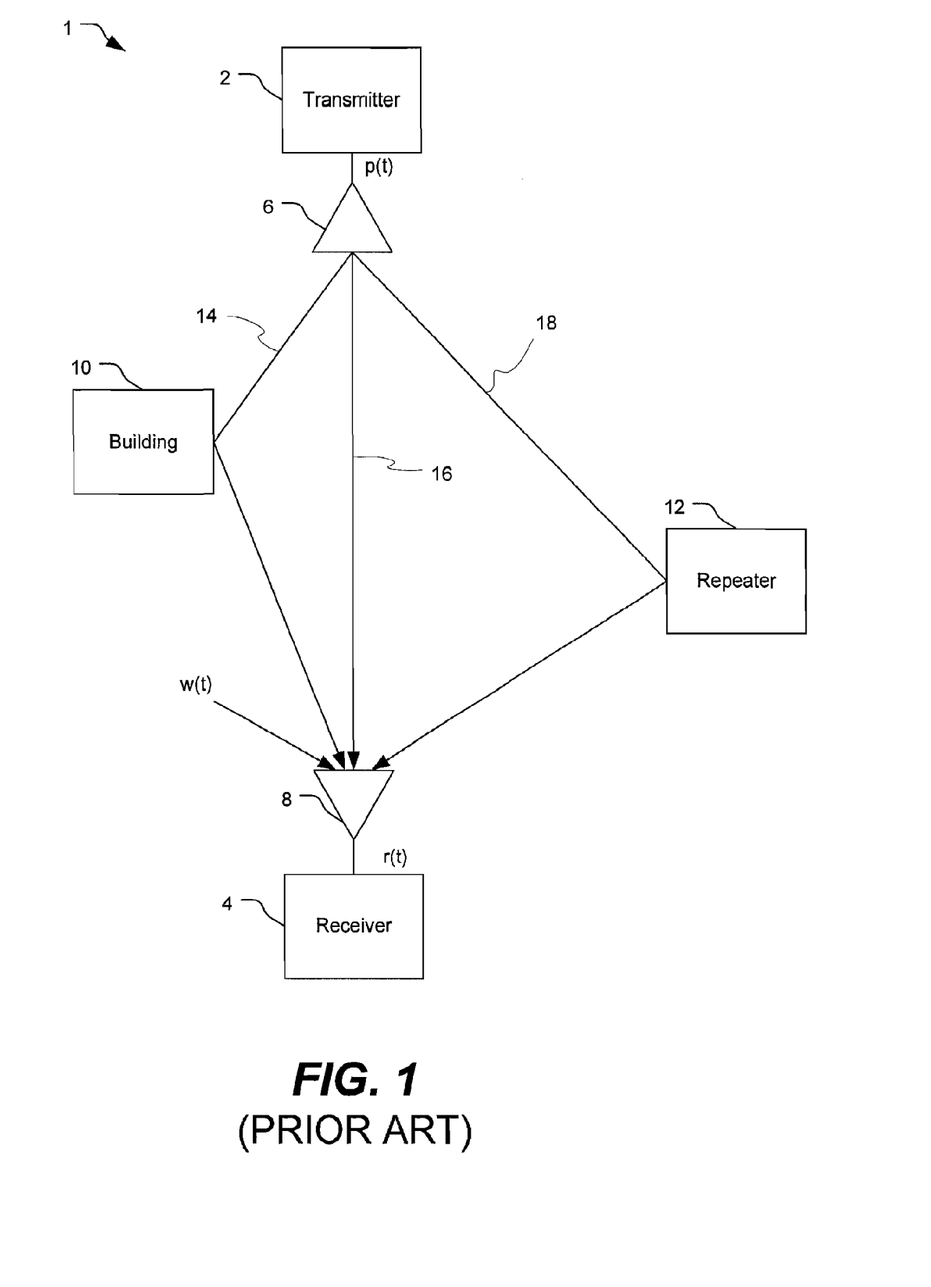
FIG. 1 is a schematic diagram of a transmission channel.

Referring to FIG. 1, a communications system 1 includes a transmitter 2 and a receiver 4. The transmitter 2 and the receiver 4 have respective antennas 6 and 8, here shown externally to the transmitter 2 and the receiver 4, although the antennas 6 and 8 may be considered to be parts of the transmitter 2 and the receiver 4. The transmitter 2 is configured to send information over the propagation medium to the receiver 4 (e.g., as signals 14, 16, and 18). Transmitting information over the propagation medium introduces signal distortion caused by noise (e.g., static), strength variations (fading), phase shift variations, Doppler spreading, Doppler fading, multiple path delays, etc. Multiple path delays result from the transmitted signals taking different paths between the transmitter and receiver through the propagation medium, e.g., due to reflections off a building 10 and/or being relayed through a repeater station 12. Different paths of a transmitted signal p(t) (e.g., the signals 14, 16, and 18) result in different gains and different delay times that can cause time-delayed copies of the signal p(t) to arrive at different times at the receiver 4 (like an echo) compared to the directly-transmitted signal 16. The received signal r(t) is a combination of the directly-transmitted signal and/or the replicas, if any. Multi-path distortion results in intersymbol interference (ISI) in which weighted contributions of other symbols are added to the current symbol, and/or interchannel interference in which separate sub-carriers interfere with each other. Noise and/or interference in the signal r(t) can also come from other sources such as the transmitter. These effects can cause errors in the transfer and/or interpretation of information from the transmitter 2 to the receiver 4. When a bit error rate (BER) of a system exceeds a threshold and overcomes the error tolerance of the system, the system fails.

Orthogonal Frequency Division Multiplexing (OFDM) can be used to transmit multiple DTV signals over the propagation medium. OFDM systems transmit a signal, such as a television signal, in parallel over one or more sub-carriers, using one or more time slots in each sub-carrier. Each sub-carrier is located at a different portion of a frequency spectrum used to transmit the DTV signals. The spacing of the sub-carriers is such that each sub-carrier's frequency is orthogonal to each of the other sub-carriers' frequencies (e.g., frequency spacing of the sub-carriers is substantially equal to the inverse of an OFDM symbol duration). The orthogonality of the sub-carrier frequencies provides a higher resistance to RF interference and multi-path distortion than when non-orthogonal frequencies are used as sub-carriers. Each sub-carrier includes, for example, data symbols, pilot symbols, and/or Transmission Parameter Signals (TPS) symbols, which are a special type of data symbol. The pilot symbols are predetermined known signals used to help a receiver estimate transmission channels.

Once an OFDM signal (e.g., r(t)) is received by the receiver 4, channel estimation is used to cancel the effects of the distortion on the transmitted signal (e.g., p(t)). For example, because r(t) is a linear combination of the signals 14, 16, and 18, a specific mathematical function (i.e., a transfer function) can describe the relation of p(t) to r(t). Once the transfer function of the propagation medium is known, a filter that is the inverse of the transfer function of the propagation medium can be used to reduce the effects of the distortion introduced by the propagation medium. Because the propagation medium is constantly changing (e.g., objects that create multi-path errors can move, weather can change, noise levels can change, etc.), the transfer function of any given propagation medium is also constantly changing. When the propagation medium is changing slowly, r(t) becomes a "slow fading" transmission channel, which can affect the estimation process. "Long channels" occur when the propagation medium has a long delay spread. For example, if the distance that the signal 18 travels to reach the receiver 4 is sufficiently long compared to the signal 16, a symbol in the signal 18 may arrive at the receiver 4 after the same symbol arrives via the signal 16, thus creating ISI.

SUMMARY

In general, in an aspect, the invention provides a receiver for receiving an orthogonal frequency division multiplexed (OFDM) digital video broadcast (DVB) signal including OFDM symbol sets including data symbols and pilot symbols transmitted using a plurality of sub-carriers, the OFDM DVB signal being transmitted toward the receiver via a transmission channel, the receiver including an input processor configured to receive the OFDM DVB signal via the transmission channel and to perform a Fourier transform on the OFDM DVB signal to provide a frequency-domain signal, a channel estimation processor coupled to the input processor and configured to calculate final channel estimates, the channel estimation processor being configured to perform time-domain prediction on the frequency-domain signal to provide established sub-carriers that each have corresponding initial channel estimates, and perform minimum mean square error (MMSE) equalization on the frequency-domain signal using the initial channel estimates that correspond to a sub-set of the established sub-carriers to calculate the final channel estimates.

Implementations of the invention may include one or more of the following features. The channel estimation processor is configured to perform time-domain prediction using MMSE equalization. The channel estimation processor is configured to calculate MMSE filter coefficients by calculating a time-domain correlation value corresponding to the transmission channel. The time-domain correlation value is calculated using sub-carriers that include continuous pilot symbols. The time-domain correlation value is at least one of an initial time-domain correlation value and a steady-state time-domain correlation value. The established sub-carriers correspond to sub-carriers that include scattered pilot symbols. The channel estimation processor is configured to select, as the sub-set of established sub-carriers, N closest established sub-carriers having frequencies lower than a frequency used to transmit a data symbol under inspection and N closest established sub-carriers having frequencies higher than a frequency used to transmit the data symbol under inspection. The channel estimation processor calculates a final channel estimate corresponding to each respective sub-carrier used to transmit each of the OFDM symbol sets.

In general, in another aspect, the invention provides a method for computing channel estimates of a transmission channel used to transmit an orthogonal frequency division multiplexed (OFDM) digital video broadcast (DVB) signal including OFDM symbol sets including data symbols and pilot symbols transmitted using a plurality of sub-carriers, the method including receiving the OFDM DVB signal at a receiver via a transmission channel, performing Fourier transforms on the OFDM DVB signal to provide a frequency-domain signal, performing time-domain prediction on the frequency-domain signal to provide established sub-carriers that each have corresponding initial channel estimates, and performing minimum mean square error (MMSE) equalization on the frequency-domain signal using the initial channel estimates that correspond to a sub-set of the established sub-carriers to calculate the final channel estimates.

Implementations of the invention may include one or more of the following features. The method further includes performing time-domain prediction using MMSE equalization. The method further includes calculating MMSE filter coefficients by calculating a time-domain correlation value corresponding to the transmission channel. Calculating the MMSE filter coefficients includes calculating the MMSE filter coefficients using sub-carriers that include continuous pilot symbols. Calculating the MMSE filter coefficients includes calculating at least one of an initial time-domain correlation value and a steady-state time-domain correlation value. The established sub-carriers correspond to sub-carriers that include scattered pilot symbols. The method further includes selecting, as the sub-set of established sub-carriers, N closest established sub-carriers having frequencies lower than a frequency used to transmit a data symbol under inspection and N closest established sub-carriers having frequencies higher than a frequency used to transmit the data symbol under inspection. The method further includes calculating a final channel estimate corresponding to each respective sub-carrier used to transmit each of the OFDM symbols sets.

In general, in another aspect, the invention provides a method for performing time-domain prediction for use with an orthogonal frequency division multiplexed (OFDM) digital video broadcast (DVB) signal transmitted by a transmitter, the OFDM DVB signal including OFDM symbol sets including data symbols, continuous pilot symbols, and scattered pilot symbols transmitted using a plurality of sub-carriers, the OFDM DVB signal being transmitted via a transmission channel, the method including receiving the OFDM DVB signal which has been affected by the transmission channel, performing Fourier transforms on the OFDM DVB signal to provide a frequency-domain signal, computing an averaged time-domain correlation value that corresponds to the transmission channel using a plurality of the continuous pilot symbols included in the frequency domain signal, computing minimum mean square error (MMSE) filter coefficients using the averaged time-domain correlation value, and performing MMSE equalization using the filter coefficients to calculate channel estimates corresponding to a sub-set of the sub-carriers.

Implementations of the invention may include one or more of the following features. Computing the averaged time-domain correlation value includes calculating a time-domain correlation value that corresponds to each sub-carrier, which include the continuous pilot symbols, used to transmit each of the OFDM symbols sets. The sub-set of the sub-carriers includes each of the sub-carriers that include the scattered pilot symbols. The method further includes estimating the OFDM DVB signal transmitted by the transmitter to provide an estimated signal, and recalculating the averaged time-domain correlation value using the estimated signal.

Various aspects of the invention may provide one or more of the following capabilities. Computations performed by a DTV channel estimation module can be reduced compared to prior techniques. Implementation cost for a DTV channel estimation module can be reduced compared to prior techniques. Channel estimates can be calculated using time-domain interpolation and frequency domain Minimum Mean Square Error estimation. MMSE estimation can be performed using a sub-set of pilot symbols provided via an OFDM DTV signal. Pilot symbols (e.g., four) can be used to calculate a channel estimate of a frequency selected channel.

These and other capabilities of the invention, along with the invention itself, will be more fully understood after a review of the following figures, detailed description, and claims.

DETAILED DESCRIPTION

Embodiments of the invention provide techniques for transmission channel estimation and equalization of digital video broadcast (DVB) transmissions by performing time-domain prediction in combination with frequency-domain interpolation. A processor is configured to receive a frequency-domain DVB signal transmitted via a transmission channel using a plurality of sub-carriers. The processor determines which sub-carriers include continuous pilot symbols. The processor uses the continuous pilot symbols to calculate a time-domain correlation value. The time-domain correlation value is used by the processor to calculate minimum mean-square error (MMSE) coefficients, which are used to calculate time-domain channel estimates of each of the sub-carriers that include scattered pilot symbols. The processor determines a frequency-domain correlation value which is combined with a sub-set of the time-domain channel estimates to perform MMSE interpolation. The processor uses a sub-set of the time-domain channel estimates to interpolate channel estimates for symbols transmitted using sub-carriers that do not include pilot symbols. Other embodiments are within the scope of the invention.

Figure 2:
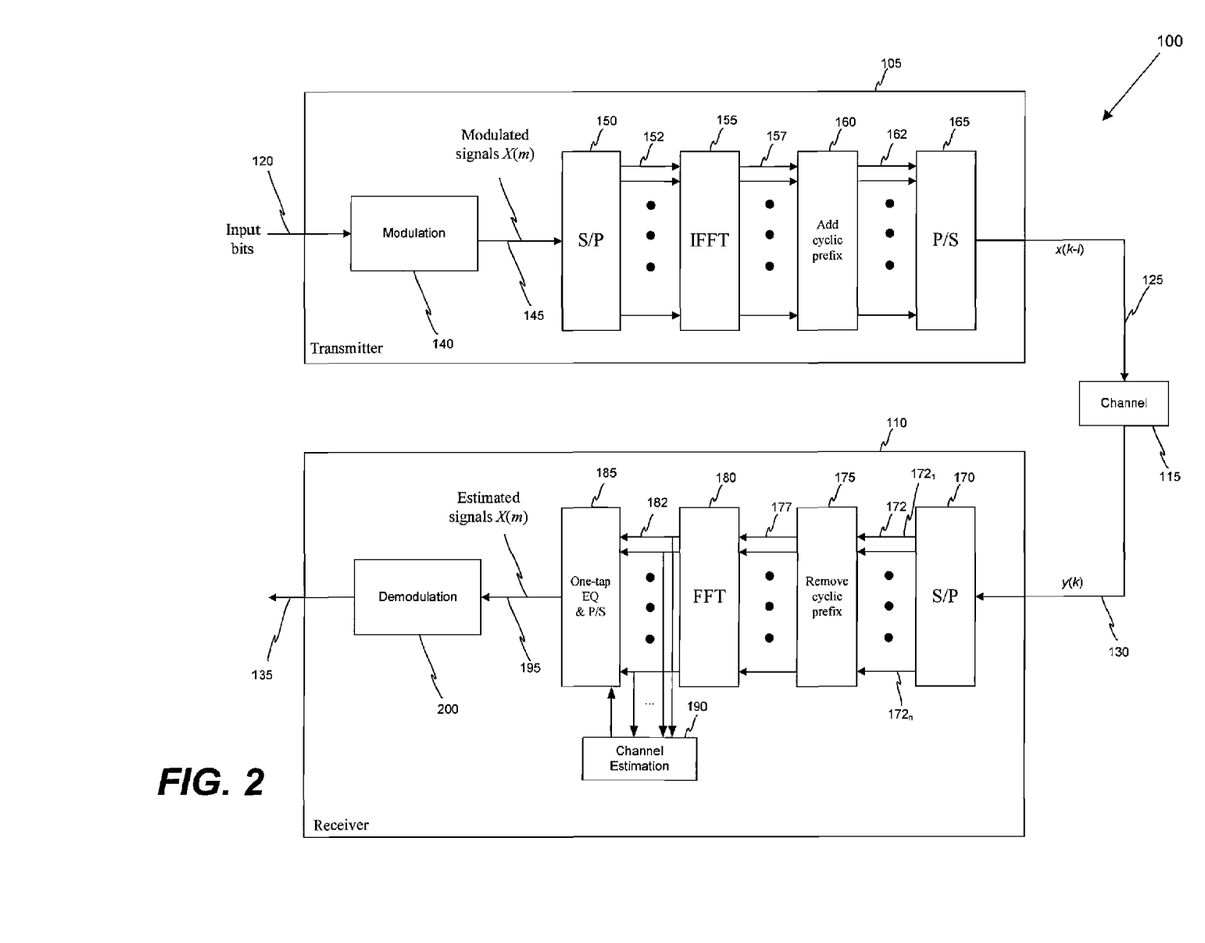
FIG. 2 is a block diagram of a baseband OFDM system including a transmitter and a receiver.

Referring to FIG. 2, an OFDM transmission system 100 includes a transmitter 105 and a receiver 110. The system 100 includes appropriate hardware, firmware, and/or software (including computer-readable, preferably computer-executable instructions) to implement the functions described below. The transmitter 105 and the receiver 110 can be configured to communicate various types of information. Here, as an example only and not as a limitation, the transmitter 105 is a transmitter for DTV signals and the receiver 110 is a DTV receiver such as a digital television or a set-top box and digital television combination. For example, the system 100 is configured to transmit and receive terrestrial DTV signals in accordance with the DVB-T/H standard via antennas (not shown in FIG. 2). The transmitter 105 and the receiver 110 are linked by a transmission channel 115. The transmission channel 115 is a propagation medium such as the atmosphere (in the case of a terrestrial broadcast), although other propagation mediums are possible (e.g., a cable with appropriate transmitters and receivers being used). The transmitter 105 is configured to receive an input signal 120 and to broadcast an OFDM signal 125 towards the receiver 110. The transmission channel 115 can affect the signal 125 and transform it into a signal 130. The receiver 110 is configured to receive the signal 130 and to output an output signal 135, which is preferably substantially equal to the signal 125.

The relation of the signals 125 and 130 can be defined in the time-domain as:

$$y(k) = \sum_{l=0}^{L-1} h_l(k)x(k-l) + n(k), 0 \le k \le M-1, \quad (1)$$

where y(k) is the signal 130, l is an index of a channel path (of the transmission channel 115) that represents channel taps in the time domain, x(k−l) is the signal 125, $h_l(k)$ is the channel impulse response (CIR) at time k of the $l^{th}$ path of the transmission channel 115, n(k) (0≦k≦M−1) are independent complex-valued random Gaussian variables (e.g., additive white Gaussian noise (AWGN)) in the time domain having a zero mean and a variance of $\sigma^2$ for both real and imaginary components, L is a number representing the delay spread of the transmission channel 115, and M is a quantity of sub-carriers used by the transmitter 105. The CIR $h_l(k)$, (0≦l≦L−1) can be independent complex-valued random variables for different paths that have a Gaussian distribution, which can represent a channel having frequency selective Rayleigh fading where $$E\{|h_l(k)|^2\} = \sigma_l^2. \quad (2)$$

Variation of the transmission channel 115 over time can be characterized by a value $f_dT_s$, where $f_d$ is the Doppler Frequency and $T_s$ is the OFDM symbol set duration. Furthermore, a power spectrum of a Rayleigh fading process (e.g., time-spreading of a signal (or signal dispersion) and/or time-variant behavior of the transmission channel 115) can be defined as:

$$S_l(f) = \begin{cases} \dfrac{\sigma_l^2}{\pi\sqrt{f_d^2 - f^2}}, & |f| < f_d^2 \\ 0, & \text{otherwise} \end{cases} \quad (3)$$

where the correlation of a CIR tap (e.g., the CIR for a single path of a multi-path signal) in the time domain can be characterized as:

$$E\{h_l(k_1)h_l^*(k_2)\} = \sigma_l^2 J_0(2\pi f_d |k_1 - k_2| T_s/M), \quad (4)$$

where $J_0(\bullet)$ is the $0^{th}$ order Bessel function of the first kind:

$$J_0(x) = \sum_{k=0}^{\infty} \dfrac{(-1)^k}{2^{2k}(k!)^2} x^{2k}. \quad (5)$$

The transmitter 105 includes a modulation unit 140, a serial-to-parallel (S/P) converter 150, processors 155 and 160, and a parallel-to-serial (P/S) converter 165. The modulation unit 140 is configured to receive a frequency-domain signal 120 that includes information (e.g., information representative of a video image) and to modulate the signal 120 using one (or more) of several modulation schemes. For example, the modulation unit 140 can map the signal 120 to a constellation using a modulation scheme such as quadrature phase shift keying (QPSK), or quadrature amplitude modulation (QAM) (e.g., 16QAM or 64QAM), although other modulation schemes are possible. The modulation scheme can be different for each sub-carrier (e.g., one sub-carrier can be modulated using 16QAM, and another using QPSK), or all sub-carriers can use the same modulation scheme. The modulation unit 140 is configured to output a modulated signal 145 that can include complex data variables (e.g., X(0), . . . , X(M−1), where M is the number of sub-carriers (e.g., the number of samples in one OFDM symbol)). The modulation unit 140 is configured to provide the modulated signal 145 to the S/P converter 150. The S/P converter 150 is configured to convert the signal 145 into a parallel information signal 152 that can be provided to the processor 155 over parallel streams. The number of parallel streams can depend on the type of DVB system being implemented (e.g., a 2K, 4K, or 8K system). The processor 155 is configured to perform an Inverse Fast Fourier Transform (IFFT) on the signal 152 to convert the signal 145 into a time-domain signal 157 that includes output symbols x(0), . . . , x(M−1). The processor 160 is configured to add a cyclic prefix to the beginning of each output symbol produced by the processor 155 and to produce a signal 162. The cyclic prefix of a frame x can replicate a portion of a frame x−1, and can be used to reduce the effects of intersymbol interference (ISI). The P/S converter 165 is configured to convert the signal 162 into the serial transmitted signal 125. The transmitter 105 is configured to broadcast the signal 125 via an antenna (not shown in FIG. 2). While the transmitter 105 has been described as including multiple processors and hardware pieces, the functionality provided by the transmitter 105 can be combined into, for example, a single chip having multiple software modules that perform the respective tasks.

Figure 3:
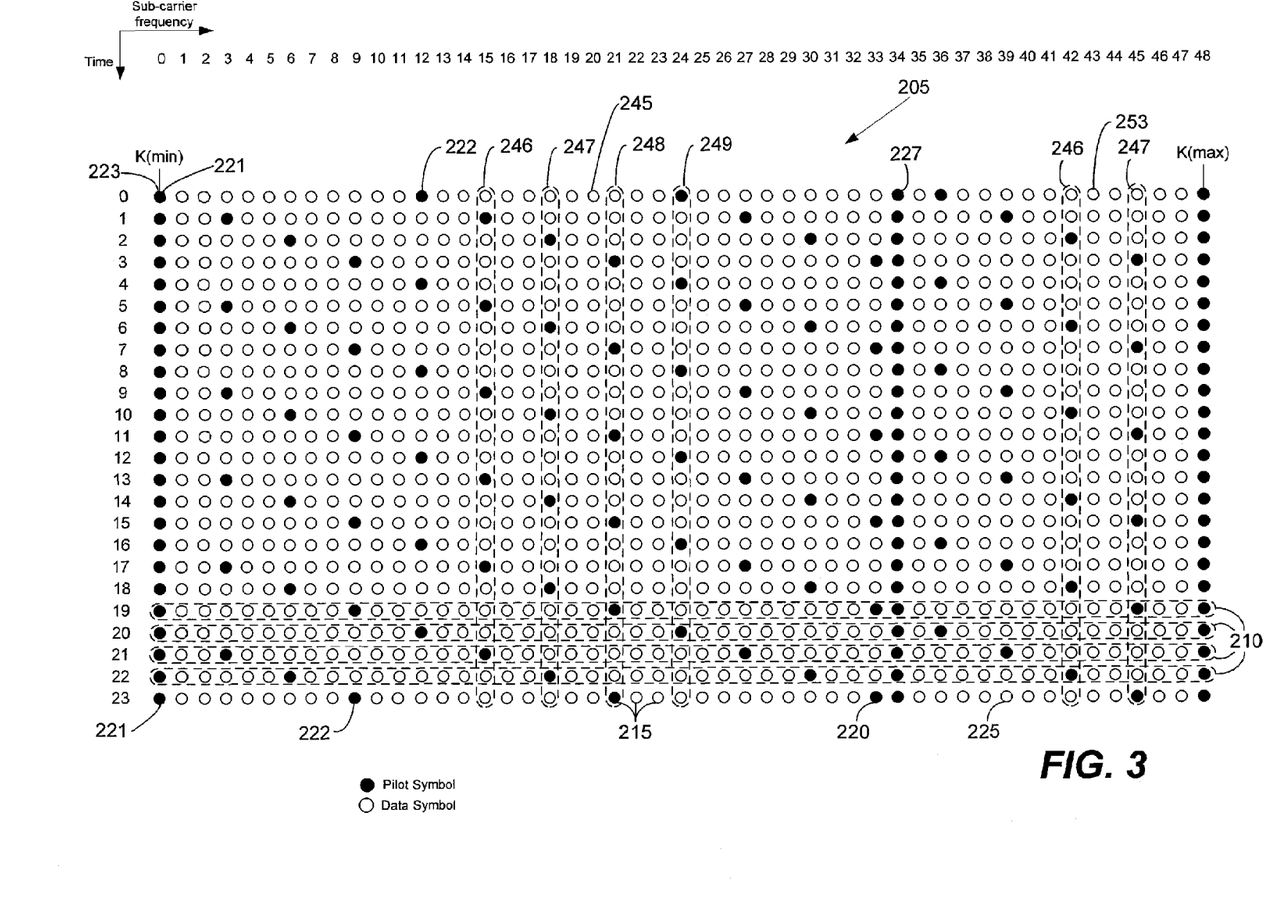
FIG. 3 is a diagram of an OFDM frame transmitted by the transmitter shown in FIG. 2.

Referring to FIG. 3, the signal 125 includes an OFDM frame 205 including OFDM symbol sets 210. Each of the OFDM symbol sets 210 include multiple symbols 215 modulated by distinct sub-carrier frequencies (e.g., represented across the x-axis of FIG. 3). Each OFDM symbol set 210 includes pilot symbols 220, data symbols 225, and TPS symbols 227, although other configurations are possible. The pilot symbols 220 include continuous pilot symbols 221 that are modulated by the same sub-set of sub-carrier frequencies in each of the OFDM symbol sets 210, and scattered pilot symbols 222 that are disposed at different sub-carrier positions in different symbol sets 210. The spacing between each of the scattered pilot symbols 222 is twelve symbol positions such that every twelfth symbol position in an OFDM symbol set 210 is occupied by a scattered pilot symbol. Likewise, for each sub-carrier that contains the scattered pilot symbols (e.g., the sub-carriers 3, 6, and 9), the scattered pilot symbols 222 occur with a period of four, although other configurations are possible. Occurrences of the continuous pilot symbols 221 and the scattered pilot symbols 222 can coincide (e.g., a pilot symbol 223). The TPS symbols can be used for the purpose of transmitting signaling parameters related to the transmission scheme (e.g., relating to channel coding and modulation). While the OFDM frame 205 is shown in FIG. 3 as including twenty-four of the OFDM symbol sets 210, and forty-nine sub-carriers, other quantities of OFDM symbols sets 210 and sub-carriers are possible. Furthermore, the placement of the pilot symbols 220, and data symbols 225 can vary from the arrangement shown in FIG. 3.

Referring again to FIG. 2, the receiver 110 includes an S/P converter 170, processors 175, 180, 185, and 190, and a demodulation unit 200. The receiver 110 is configured to receive the signal 130 and output the signal 135. The signal 130 includes time-domain information (e.g., symbols y(0), ..., y(M−1), where M is the number of sub-carriers used to transmit the signal 130). The S/P converter 170 is configured to receive the signal 130 and convert it into a parallel signal 172. The S/P converter 170 is configured such that each of the parallel paths $172_1$ through $172_n$ of the signal 172 include symbols transmitted using different sub-carrier frequencies, although other configurations are possible. The number of parallel streams in the signal 172 is equal to a quantity of the symbols 215 in each of the OFDM symbol sets 210, although other configurations are possible. The S/P converter 170 is configured to provide the signal 172 to the processor 175. The processor 175 is configured to receive the signal 172 and to remove the cyclic prefix added by the processor 160. The processor 175 is configured to provide a parallel time-domain signal 177 to the processor 180.

The processor 180 is configured to convert the time-domain signal 177 to a frequency domain signal 182 by performing a Fast Fourier Transform (FFT) operation. The FFT operation carried out by the processor 180 can be defined as:

$$Y(m) = \sum_{l=0}^{L-1} \sum_{n=0}^{M-1} X(n) H_l(m-n) e^{-j2\pi \frac{nl}{M}} + N(m), \quad (6)$$

$$0 \leq m \leq M-1,$$

where Y(m) is the signal 182, X(n) is the signal 152, N(m) is AWGN described in the frequency domain, and $H_l(m-n)$ is provided by:

$$H_l(m-n) = \frac{1}{M} \sum_{k=0}^{M-1} h_l(k) e^{-j2\pi \frac{k(m-n)}{M}}. \quad (7)$$

Equation (6) can be rewritten in vector form as:

$$\underline{Y} = H\underline{X} + \underline{N}, \quad (8)$$

where the element in the $m^{th}$ row and $n^{th}$ column of the channel matrix H is:

$$H_{m,n} = \sum_{l=0}^{L-1} H_l(m-n) e^{-j2\pi \frac{nl}{M}}. \quad (9)$$

The receiver 110 can consider interchannel interference (ICI) when computing final channel estimates, which may increase the accuracy of the calculated channel estimates. Interchannel interference can occur when the transmission channel 115 is not constant within a single OFDM symbol set 210. The ICI can be accounted for in the MMSE calculations by rewriting Equation (6) as:

$$Y(m) = H(m)X(m) + ICI(m) + N(m), \; 0 \leq m \leq M-1, \quad (10)$$

where $$H(m) = \sum_{l=0}^{L-1} \left( \frac{1}{M} \sum_{k=0}^{M-1} h_l(k) \right) e^{-j2\pi \frac{ml}{M}}, \quad (11)$$

which is the FFT of the average channel impulse response within a particular OFDM symbol, and $$ICI(m) = \sum_{l=0}^{L-1} \sum_{n=0, n \neq m}^{M-1} X(n) H_l(m-n) e^{-j2\pi \frac{nl}{M}}, \quad (12)$$

which is the interference caused by time variation in the transmission channel 115.

The processors 185 and 190 are each configured to receive the signal 182 provided by the processor 180. The processor 185 is configured to use information provided by the processor 190 (e.g., final channel estimates, as described below) to estimate the location of samples in a constellation of the chosen modulation method. For example, each of the parallel information streams in the signal 182 contains modulation symbols (e.g., 16QAM, 64QAM, and/or QPSK) and the processor 185 can map the modulation symbols to corresponding constellation points using final channel estimates provided by the processor 190. While the receiver 110 has been described as including multiple processors and other hardware pieces, the functionality provided by the receiver 110 can be combined into, for example, a single chip having multiple software modules that provide the respective functionality.

As an operational example, the receiver 110 is configured to perform time-domain channel predication and frequency-domain channel interpolation by performing the following steps.

Calculate a time-domain correlation value of the transmission channel 115.

Calculate time-domain MMSE filtering coefficients using the time-domain correlation value.

Perform MMSE channel prediction on each sub-carrier that includes the scattered pilot symbols 222 in order to obtain time-domain channel estimates using the time-domain correlation value.

Optionally, re-estimate the time-domain correlation value in order to re-estimate the time-domain channel estimates for each of the sub-carriers that include the scattered pilot symbols 222.

Estimate the signal transmitted by each of the sub-carriers that include the pilot symbols 222.

Calculate a frequency-domain channel correlation value of the transmission channel 115.

Calculate frequency-domain MMSE filtering coefficients using the frequency-domain correlation value and the time-domain channel estimates calculated for each of the sub-carriers that include the scattered pilot symbols 222.

Perform MMSE channel estimation using the frequency-domain MMSE coefficients and a sub-set of the sub-carriers that have previously-calculated corresponding time-domain channel estimates.

Provide a final channel estimate to the processor 185.

Referring to FIG. 2, the processor 190 is configured to perform channel prediction estimation using the signal 130, or a derivative of the signal 130 (e.g., the signal 182) using several consecutive ones of the OFDM symbols 210. Thus, the processor 190 is configured to perform time-domain channel prediction using consecutively received OFDM symbol sets 210 (i.e., the processor 190 preferably does not analyze the time-domain video signal transmitted using the OFDM frame 205). The processor 190 can perform time-domain channel prediction using multiple methods including MMSE estimation and least mean-square (LMS) estimation. While the foregoing description focuses on MMSE estimation, other methods can be used.

Referring again to FIGS. 2-3, the processor 190 is configured to process the signal 182 using MMSE estimation in order to calculate a channel estimate (e.g., the transfer function of the transmission channel 115) using known pilot symbols that have been received by the receiver 110. The processor 190 is configured to use the a priori known values of the pilot symbols 222 as anchor points for estimating characteristics of the transmission channel 115. The processor 190 is configured to expect the pilot symbols 222 at certain times in certain sub-carriers of the OFDM frame 205 (e.g., as described above). The processor 190 is configured to search the signal 130 for the pilot symbols 222, which have been affected by the transmission channel 115 (e.g., according to the transfer function shown in Equation (1)). For each of the sub-carriers that include the scattered pilot symbols 222, the processor 190 is configured calculate a channel estimate that corresponds to the intervals (e.g., there is a triplet of data symbols between consecutive ones (in time) of the pilot symbols 222) between consecutive (in time) ones of the scattered pilot symbols 222 being received by the receiver 110. For example, the processor 190 is configured to use a sub-set of the scattered pilot symbols 222 received via a sub-carrier of interest to calculate a channel estimate.

The processor 190 is configured to calculate a time-domain correlation value that can be used to perform time-domain prediction. Correlation is the measure of how well a transfer function of the transmission channel 115 at a first time can be predicted based on a measurement of a transfer function of the transmission channel 115 at a second time. A higher correlation value between the first and second times indicates that there is a higher probability of predicting the behavior (e.g., the transfer function) of the transmission channel 115 at the first time based on observations of the transmission channel 115 at the second time. Thus, larger values of correlation can indicate that the transmission channel 115 has a transfer function that changes very slowly, thus permitting a higher level of predictability of the transmission channel 115 over time. A smaller correlation value can indicate that the transmission channel 115 changes very quickly, thus lowering the level of predictability of the transmission channel 115 over time.

The processor 190 is configured to estimate a time-domain channel correlation by examining a sub-set of the sub-carriers used to transmit the signal 130. For example, the processor 190 is configured to estimate a time-domain correlation value by performing calculations using only the sub-carriers that include pilot symbols (e.g., the continuous pilot symbols 221 and/or the scattered pilot symbols 222). The sub-set of sub-carriers used to calculate the time-domain channel correlation can vary depending on the state of operation of the receiver 110. Preferably the processor 190 is configured to use a first method to calculate an initial time-domain correlation (e.g., at startup of the receiver 110 and/or when the receiver 110 begins to receiver a new signal), and a second method when the receiver 110 is operating in a steady-state (e.g., after several of the ODFM symbols 210 have been received by the receiver 110). The first method, however, can be used at other times as well.

The processor 190 is configured to calculate the initial time-domain channel correlation using the sub-carriers that include the pilot symbols 221 and/or 222. Preferably, the processor 190 is configured to calculate the initial time-domain channel correlation using only the sub-carriers that include the continuous pilot symbols 221. For example, in a 2 k DVB-T/H system, the processor 190 is configured to use sub-carriers 0, 48, 54, 87, 141, etc. to calculate the initial time-domain channel correlation. The processor 190 is configured to calculate the initial time-domain correlation according to:

$$\tilde{R}_t(n) = \frac{1}{K} \sum_{p=cont.pilots} \sum_{(k_2-k_1)_M=n} Y^*_{k_1}(p)Y_{k_2}(p), \quad (13)$$

where Y(p) is the received symbol at sub-carrier p of a received OFDM symbol 210, $k_x$ is the symbol index representing the $x^{th}$ symbol in a given sub-carrier, and K is the total number of cases that satisfy $(k_2-k_1)_M=n$. Using Equation (13), the processor 190 is configured to calculate a channel correlation value for each of the sub-carriers that include the continuous pilot symbols 221, which are averaged to arrive at $\tilde{R}_t(n)$. Alternatively, the processor 190 can be configured to calculate the initial time-domain correlation using the sub-carriers that include the scattered pilot symbols 222 as well.

The number of consecutive OFDM symbols 210 used to calculate the initial time-domain channel correlation can vary depending on the size of the matrix in Equation (18) and/or (21) (see below). For example, if Equation (21) is used by the processor 190, then the processor 190 is configured to use at least the first five OFDM frames 210 to calculate an initial time-domain correlation value. Other quantities of the OFDM frames 210 can be used depending on how many symbols will be use to perform prediction and/or interpolation. If Equation (18) is used by the processor 190, then the processor 190 is configured to use at least the first thirteen OFDM frames 210 to calculate an initial time-domain correlation value. While the initial time-domain correlation is calculated using the sub-carriers that include the continuous pilot symbols 221, the calculated time-domain correlation value can also apply to the sub-carriers that include the scattered pilot symbols 222 (e.g., in later calculations). Furthermore, the processor 190 can be configured to store (e.g., in a memory) all of the calculated channel estimates, or only those channel estimates used in Equations (18) and/or (21).

The processor 190 is configured to calculate a steady-state time-domain channel correlation value using one or more methods. Preferably, the processor 190 is configured to calculate a steady-state time-domain channel correlation value using previously calculated time-domain channel correlation values stored in a memory (e.g., which can reduce the complexity of time-domain correlation calculation process). If it is assumed that the fifteen previous pilot symbols (e.g., the symbols 215) received by the receiver 110 of each of the sub-carriers 0:3:k(max) are stored in memory, then the processor 190 can calculate the channel correlation according to:

$$\tilde{R}_t(n) = \frac{3}{k(\max)+3} \sum_{p=0:3:kmax} \hat{H}^*_t(p)\hat{H}_{t-n}(p). \quad (14)$$

where $\hat{H}_{t-n}(p)$ is the channel estimate of the symbol that was received n symbols prior to the current symbol t. The processor 190 is configured to filter the output of Equation (14) to obtain a final time-domain channel correlation value using a filter operation according to:

$$\hat{R}_t(m)=(1-\beta_t)\hat{R}_t(m)+\beta_t\tilde{R}_t(m), \quad (15)$$

where $\beta_t$ is a filter coefficient that is preferably $0 \leq \beta_t \leq 1$, and can depend on how quickly the correlation is updated (e.g., if a faster update speed is desired, $\beta_t$ can be set closer to 1, and if smoother values are desired, $\beta_t$ can be set closer to 0). The processor 190, however, can calculate the steady-state time-domain correlation value using other equations such as Equation (13).

The processor 190 is configured to calculate channel estimates of the sub-carriers that include the scattered pilot symbols 222 in order to perform time-domain prediction. As shown in FIG. 3, in sub-carriers that include the scattered pilot symbols 222, triplets of data symbols are surrounded (in time) by the scattered pilot symbols 222. The processor 190 is configured to calculate channel estimates corresponding to a sub-carrier of interest (e.g., a sub-carrier that includes the scattered pilot symbols 222) using a sub-set of the scattered pilot symbols 222 received prior to a triplet of data symbols of interest. For example, to calculate channel estimates corresponding to symbols 14, 15, and 16 of sub-carrier 3, the processor 190 is configured to use the symbols 1, 5, 9, and 13 (i.e., the scattered pilot symbols 222). The processor 190 is configured to calculate the channel estimates corresponding to a triplet of data symbols of interest according to:

$$\hat{H}_m(p) = \sum_{k=1}^{4} c_{m,k} H_k(p), m = 1, 2, 3, \quad (16)$$

where $p \in (0:3:k_{max})$, $$\underline{c_m} = [c_{m,1} \; c_{m,2} \; c_{m,3} \; c_{m,4}] \quad (17)$$
$$= [R_t(m+12) \; R_t(m+8) \; R_t(m+4) \; R_t(m)] R_t^{-1},$$
$$m = 1, 2, 3$$

and, where $$R_t = \begin{bmatrix} R_t(0) & R_t^*(4) & R_t^*(8) & R_t^*(12) \\ R_t(4) & R_t(0) & R_t^*(4) & R_t^*(8) \\ R_t(8) & R_t(4) & R_t(0) & R_t^*(4) \\ R_t(12) & R_t(8) & R_t(4) & R_t(0) \end{bmatrix} + \sigma^2 I, \quad (18)$$

where I is an identity matrix. $R_t$ is preferably calculated for each triplet of data symbols received on each sub-carrier by the receiver 110. Note that $R(-m)=R^*(m)$ and $R(M-m)=R^*(m)$. Preferably, at startup of the receiver 110, the correlation values in Equation (18) are initial time-domain correlation values and once the receiver 110 reaches steady state operation, the correlation values in Equation (18) are preferably the steady-state time-domain correlation values.

Alternatively, the processor 190 can be configured to calculate channel estimates using other quantities of the scattered pilot symbols 222 received prior to receiving a triplet of data symbols of interest. For example, the processor 190 is configured to calculate the channel estimate, using two of the scattered pilot symbols 222, corresponding to a triplet of data symbols of interest according to:

$$\hat{H}_m(p) = \sum_{k=1}^{2} c_{m,k} H_k(p), m = 1, 2, 3, \quad (19)$$

where $$\underline{c_m} = [c_{m,1} \; c_{m,2} \; c_{m,3} \; c_{m,4}] \quad (20)$$
$$= [R_t(m+4) \; R_t(m)] R_t^{-1},$$
$$m = 1, 2, 3,$$

and, where $$R_t = \begin{bmatrix} R_t(0) & R_t^*(4) \\ R_t(4) & R_t(0) \end{bmatrix} + \sigma^2 I, \quad (21).$$

where I is an identity matrix. $R_t$ is preferably calculated for each triplet of data symbols received on each sub-carrier by the receiver 110. Note that $R(-m)=R^*(m)$ and $R(M-m)=R^*(m)$. Preferably, at startup of the receiver 110, the correlation values in Equation (21) are initial time-domain correlation values and once the receiver 110 reaches steady state operation, the correlation values in Equation (21) are preferably the steady-state time-domain correlation values.

Preferably, the processor 190 is configured to use the closest previously-received sub-set of the scattered pilot symbols 222 to perform time-domain prediction. For example, assuming the processor 190 uses Equation (16), the processor 190 is configured to use symbols 5, 9, 13, 17 (i.e., which are the scattered pilot symbols 222) to perform time-domain prediction of the symbols 18-20, and to use the symbols 9, 13, 17, and 21 to perform time-domain prediction of the symbols 22-24.

Equations (16) and (19) are preferably modified for use by the processor 190 when the receiver 110 is not operating in a steady-state. For example, Equation (16) can be modified to:

$$\hat{H}_m(p) = \sum_{k=1}^{4} c_{m,k} Y_k(p), m = 1, 2, 3, \quad (22)$$

and Equation (19) can be modified to:

$$\hat{H}_m(p) = \sum_{k=1}^{2} c_{m,k} Y_k(p), m = 1, 2, 3. \quad (23)$$

The processor 190 can be configured to further refine the initial time-domain channel correlation calculated above, which can further increase the accuracy of the time domain prediction performed by the processor 190. The processor 190 can be configured map the signal 130 to the constellation corresponding to the modulation used by the modulation unit 140. For example, if 16QAM is used by the modulation unit 140 (e.g., which is a priori known by the modulation unit 140), the processor 190 is configured to estimate the signal 125 using the signal 130 according to:

$$\hat{X}_m(p) = \frac{Y_m(p)}{\hat{H}_m(p)}, \quad (24)$$

where $Y_m(p)$ is the signal 130, $\hat{H}_m(p)$ is the channel estimates calculated using Equations (16) and/or (19), and $\hat{X}_m(p)$ is the estimated version of the signal 125 generated using the channel estimates $\hat{H}_m(p)$. The processor 190 is configured to replace estimated symbols that are a priori known symbols (e.g., the pilot symbols 222) in $\hat{X}_m(p)$ to produce $\hat{X}_{m(corr)}(p)$. The processor 190 is configured to calculate $\hat{H}_m(p)$ according using $\hat{X}_{m(corr)}(p)$ according to:

$$\hat{H}_m(p) = \frac{Y_m(p)}{\hat{X}_{m(corr)}(p)}. \quad (25)$$

The output of Equation (25) can be used to recalculate the steady-state time-domain channel correlation. Alternatively, the use of Equations (24) and (25) can be omitted.

Alternatively, if a transmission has a very high correlation (e.g., that the transmission channel 115 can be considered "static"), the time-domain correlation estimation and MMSE prediction coefficients calculation can be bypassed. For example, the MMSE prediction coefficients can be fixed to [0.25, 0.25, 0.25, 0.25] (e.g., when using four pilots) and [0.5, 0.5] (e.g., when using two pilots). Furthermore, additional channel estimate averaging after MMSE interpolation can lead to improved system performance.

The processor 190 can also be configured to perform time-domain prediction using an LMS algorithm. A description of an exemplary LMS algorithm is described in U.S. patent application Ser. No. 11/261,614, filed Oct. 31, 2005, which is incorporated by reference herein to the extent it is not inconsistent with the present application.

The processor 190 is configured to use information calculated about established sub-carriers (e.g., the sub-carriers that include the scattered pilot symbols 222) to calculate channel estimates corresponding to the sub-carriers that do not include the scattered pilot symbols 222. Using information provided from time-domain channel prediction (e.g., using MMSE as described above), the processor 190 is configured to treat all of the established sub-carriers as having assumed known channel estimates. For example, as calculated using MMSE, the processor 190 is configured to treat as known the channel estimates of the sub-carriers 15, 18, 21, and 24. The processor 190 is configured to use the assumed known channel estimates to perform frequency based interpolation to calculate channel estimates corresponding to the sub-carriers that do not include the scattered pilot symbols 222 (e.g., the sub-carriers 13-14, 16-17, 19-20, 22-23, etc.).

The processor 190 is configured to assume a correlation of the transmission channel 115 across the frequency domain. Related to the time-domain correlation discussed above, frequency-domain correlation is the measure of how well a transfer function of a first sub-carrier can be predicted based on a measurement of a transfer function of a second sub-carrier. A higher correlation value between two sub-carriers indicates that there is a higher probability of predicting the behavior (e.g., the transfer function) of the first sub-carrier based on observations of the second sub-carrier. Thus, larger values of correlation can indicate that the sub-carrier frequencies have very similar transfer functions to one another, thus permitting a higher level of predictability between two sub-carriers. A smaller correlation value can indicate that the channels are independent, thus lowering the level of predictability between two sub-carriers. The processor 190 is configured to assume the frequency domain correlation according to:

$$R_f(m) = \sum_{l=0}^{L-1} \sigma_l^2 e^{-j2\pi \frac{ml}{M}}, 0 \le m \le M-1, \quad (26)$$

where M is the total number of sub-carriers, L is a number representing the delay spread of the transmission channel 115, and l is an index of a channel path (of the transmission channel 115). Equation (26) is preferably used when no prior OFDM symbols sets 210 have been received by the receiver 110 (e.g., at startup), although Equation (26) can be used when previous OFDM symbol sets 210 have been received.

The processor 190 is configured to perform frequency-domain channel interpolation using the assumed known channel estimates of the established sub-carriers that surround a sub-carrier of interest (e.g., a sub-carrier that does not include the scattered pilot symbols 222). The processor 190 is configured to calculate the channel estimates of the sub-carriers of interest using a sub-set of the surrounding established sub-carriers. Preferably, the assumed known channel estimates corresponding to the two closest established sub-carriers having a lower frequency than the sub-carriers of interest and the two closest established sub-carriers having a higher frequency than the sub-carriers of interest are used to perform frequency based interpolation of the sub-carriers of interest. For example, to calculate the channel estimates corresponding to the sub-carriers 19-20, the processor 190 is configured to use the assumed known channel estimates corresponding to the established sub-carriers 15, 18, 21, and 24. The processor 190, however, can be configured to calculate the channel estimates of a sub-carrier of interest using other configurations of assumed known channel estimates (e.g., assumed known channel estimates of six established sub-carriers having a lower frequency than a sub-carrier of interest). In addition, the sub-carriers that include the continuous pilot symbols (e.g., the sub-carrier 0) can be used to calculate a transfer function corresponding to a sub-carrier of interest.

For "edge" sub-carriers (e.g., sub-carriers 1 and 2), the processor 190 is configured to use the assumed known channel estimates of less than four sub-carriers. For example, there is only one established sub-carrier having a lower frequency than the sub-carriers 4-5. Likewise, there is only one established sub-carrier having a higher frequency than the sub-carriers 43-44. The sub-set of assumed known channel estimates used to calculate channel estimates for edge sub-carriers can be symmetrical or asymmetrical. For example, to calculate channel estimates for the sub-carrier 4, the channel estimates corresponding to the sub-carriers 3 and 6 can be used. Alternatively, the processor 190 can be configured to use the channel estimates corresponding to four (or more) established sub-carriers to estimate the edge sub-carriers of interest. For example, the processor 190 can be configured to use the channel estimates corresponding to the sub-carriers 3, 6, 9, and 12 to estimate a transfer function for the sub-carriers 4-5. Using fewer than four established sub-carriers to calculate the channel estimates of the sub-carriers of interest can reduce the number of calculations used in the estimation process.

The processor 190 is configured to calculate at least three sets of MMSE filtering coefficients for each of the OFDM symbols sets 210 received by the receiver 110. Each set of the MMSE filtering coefficients corresponds to one of the symbols 215 between the next lowest-frequency established sub-carrier (relative to the sub-carriers of interest) and the next-highest frequency established sub-carrier (relative to the sub-carriers of interest). Furthermore, one coefficient set corresponds to the next highest-frequency established sub-carrier (relative to the sub-carriers of interest). For example, if the sub-carriers of interest at time 0 are the sub-carriers 19-20, then a first MMSE filtering coefficient set corresponds to the symbol transmitted using the sub-carrier 19, a second set corresponds to the symbol transmitted using the sub-carrier 20, and a third set corresponds to symbol transmitted using the sub-carrier 21. Furthermore, each set of MMSE filtering coefficients corresponds to a respective symbol position (relative to surrounding established sub-carriers). For example, the first MMSE coefficient set corresponds to symbols transmitted using a sub-carrier having an index one higher than those of the lowest-frequency and closest established sub-carrier (e.g., the first MMSE coefficient set corresponds to symbols transmitted using the sub-carriers 13, 16, 19, 22, . . . ), the second MMSE coefficient set corresponds to symbols having an index two higher than those of the lowest-frequency and closest established sub-carrier (e.g., the second MMSE coefficient set corresponds to symbols transmitted using the sub-carriers 14, 17, 20, 23, . . . ), the third MMSE coefficient set corresponds to the symbols transmitted using the highest-frequency and closest established sub-carrier (e.g., the third MMSE coefficient set corresponds to symbols transmitted using the sub-carriers 15, 18, 21, 24, . . . ). The processor 190 is configured to calculate the MMSE filtering coefficient sets according to:

$$\underline{c_m} = [c_1(m) \ c_2(m) \ c_3(m) \ c_4(m)] = \qquad (27)$$
$$[R_f(m-m_1) \ R_f(m-m_2) \ R_f(m-m_3) \ R_f(m-m_4)]R_f^{-1},$$

where $(\bullet)_M$ is the modular operation and $$R_f = \begin{bmatrix} R_f(0) & R_f^*(3) & R_f^*(6) & R_f^*(9) \\ R_f(3) & R_f(0) & R_f^*(3) & R_f^*(6) \\ R_f(6) & R_f(3) & R_f(0) & R_f^*(3) \\ R_f(9) & R_f(6) & R_f(3) & R_f(0) \end{bmatrix} + \sigma^2 I, \qquad (29)$$

where $R_f$ is preferably computed for each one of the OFDM symbols sets 210 received by the receiver 110. $R_f$, however, can be computed more than once per received OFDM symbols set 210.

The processor 190 is configured to compute additional MMSE filtering coefficients corresponding to sub-carriers near the highest and lowest sub-carrier frequencies used to transmit the signal 125 (e.g., edge sub-carriers). Preferably, the processor 190 calculates three additional MMSE filtering coefficients that correspond to the sub-carriers that are between the lowest frequency sub-carrier used to transmit the signal 125 and the lowest frequency established sub-carrier. For example, the processor 190 is configured to calculate MMSE filter coefficients corresponding to the sub-carriers 1, 2, and 3. The processor 190 can be configured to calculate additional MMSE filter coefficients depending on, for example, the configuration of the pilot symbols 222 in the OFDM frame 205. Equation (29) can vary depending on the pattern of the sub-carriers that include the scattered pilot symbols 222. For example, if two of the established sub-carriers are used to calculate the transfer function of a sub-carrier of interest, then Equation (29) can be rewritten as:

$$R = \begin{bmatrix} R(0) & R^*(3) \\ R(3) & R(0) \end{bmatrix} + \sigma^2 I, \qquad (30)$$

where S is the spacing of the sub-carriers used to calculate a transfer function of a sub-carrier of interest. The processor 190 can also be configured to calculate the MMSE filtering coefficients according to:

$$\underline{c(m)} = [c_1(m) c_2(m)] = [R_f(m-m_1)R_f(m-m_2)]R^{-1}, \qquad (31)$$

While the processor 190 has been described as calculating three additional MMSE coefficient sets, other quantities of coefficients can be calculated.

Using the above filtering coefficients, the processor 190 is configured to calculate channel estimates of the sub-carriers of interest according to:

$$\hat{H}(m) = \sum_{p=1}^{4} c_p \hat{H}(m_p), \qquad (32)$$

where $\hat{H}(m_p)$ are the assumed known channel estimates of the established sub-carriers used to calculate channel estimates for the sub-carriers of interest (e.g., when estimating sub-carriers 19-20, the four surrounding sub-carriers used by the processor 190 are the sub-carriers 15, 18, 21, and 24), and $c_p$ are corresponding MMSE filtering coefficients. Furthermore, regarding Equation (32), when edge carriers are estimated, the summation can be from 1 to 2.

The processor 190 is configured to estimate the signal transmitted by the transmitter 105 (e.g., the signal 125) using the initial channel estimates. The processor 190 is configured to estimate the signal transmitted by the transmitter 105 using the channel estimates of all of the sub-carriers used to transmit the signal 125. The processor 190 is configured to calculate an estimate of the signal 125 using one-tap equalization according to:

$$\hat{X}(m) = \frac{Y(m)}{\hat{H}(m)}, 0 \le m \le M-1, \qquad (33)$$

where $\hat{X}(m)$ is an estimated version of the transmitted signal (here, the signal 125), Y(m) is the Fourier Transform of the signal 130, and $\hat{H}(m)$ are the channel estimates obtained using Equation (32).

The processor 190 is configured to substitute the received pilot symbols with the actual transmitted pilot symbols 220 and to replace the received TPS symbols with estimated TPS symbols. Replacing the received pilot symbols 220 with the actual pilot symbols, and replacing the received TPS symbols with the estimated TPS symbols, can increase the accuracy of the channel estimates calculated by the processor 190. For example, the scattered pilot symbols 222 are affected by the transmission channel 115 (as described above). The receiver 110, however, knows a priori the value of the scattered pilot symbols 222. Thus, the processor 190 can substitute the actual version of the scattered pilot symbols 222 for the received version of the scattered pilot symbols 222. The processor 190 is further configured to replace the received TPS symbols with estimated TPS symbols to establish additional known reference points. To replace the received TPS symbols with the estimated TPS symbols, the processor 190 is configured to estimate the TPS symbols by taking the average of all of the TPS symbols in a single OFDM symbol set 210 according to:

$$\hat{X}_{TPS} = \begin{cases} 1, & \sum_{p \in P_{TPS}} X(m_p) \ge 0 \\ -1, & \sum_{p \in P_{TPS}} X(m_p) < 0 \end{cases}. \qquad (34)$$

Using the substituted actual pilot symbols and averaged TPS symbols can increase the accuracy of the channel estimation process. Thus, the processor 190 is configured to modify the initial channel correlation values calculated using Equation (26). The processor 190 is configured to modify the initial channel correlation by calculating another iteration of channel estimates according to:

$$\hat{H}(m) = \frac{Y(m)}{\hat{X}(m)}, 0 \le m \le M - 1, \quad (35)$$

where $\hat{X}(m)$ is now the estimated version of the signal 125 having the substituted pilot symbols and the substituted TPS symbols. The processor 190 is configured to calculate an estimate of the channel correlation (thereby replacing the assumption made in Equation (26)) with:

$$\tilde{R}_f(m) = \frac{1}{K} \sum_{(k_2-k_1)_M = m} \hat{H}^*(k_1)\hat{H}(k_2), \quad (36)$$

where K is the number of cases that satisfy $(k_2-k_1)_M=m$. The processor 190 is configured to store $\tilde{R}(m)$ in a memory. The pilot symbols 220 and the TPS symbols are preferably used to calculate the channel correlation because the channel estimates obtained using these symbols are more reliable than using data symbols. Knowing the pilot symbols 220 a priori, the processor 190 can calculate a more accurate channel correlation. For example, the processor 190 can calculate a substantially accurate channel estimate (at the specific time and frequency of each of the respective pilot symbols 220) by comparing an actual transmitted pilot symbol to a received version of the transmitted pilot symbol. Using a substantially accurate channel estimate of the pilot symbols 220, the processor 190 can have a higher likelihood of calculating a more accurate channel correlation value. Other channels, (e.g., not a pilot or TPS symbol, can be chosen as reference points using, for example, signal-to-noise ratio as the selection criterion).

The processor 190 is configured to obtain the estimated averaged frequency-domain correlation of the transmission channel 115 according to:

$$\hat{R}_f(m) = (1-\beta_f)\hat{R}_f(m) + \beta_f \tilde{R}_f(m), \quad (37)$$

where β is a predetermined known parameter (e.g., 1/16, 1/8) used to replace a portion of the previous correlation estimate. Increasing the quantity of OFDM symbol sets 210 used to calculate the average frequency-domain channel correlation can result in a frequency-domain channel correlation that is smoother and/or closer to the actual channel correlation.

Figure 4:
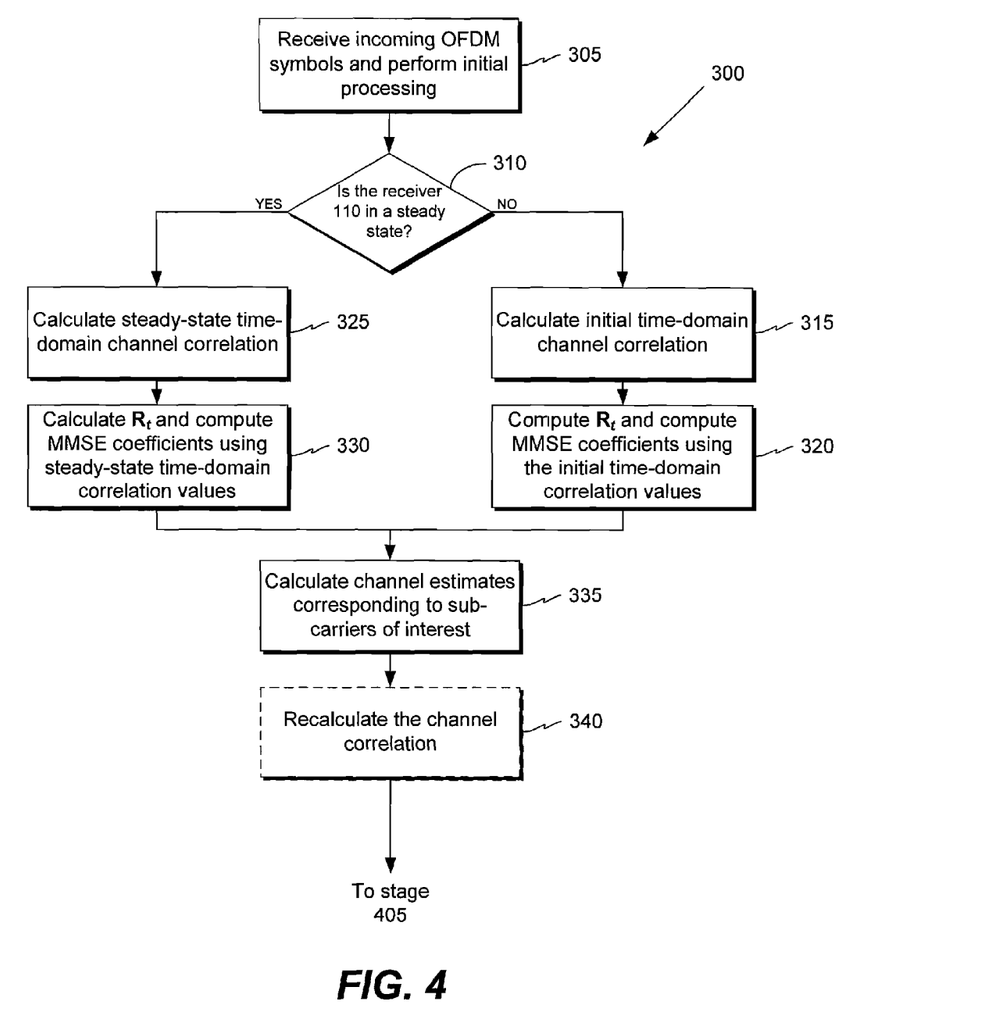
FIG. 4 is a flowchart of a process of performing time-domain prediction using MMSE.

In operation, referring to FIG. 4, with further reference to FIGS. 2-3, a process 300 for performing time-domain prediction using MMSE and the system 100 includes the stages shown. The process 300, however, is exemplary only and not limiting. The process 300 may be altered, e.g., by having stages added, removed, altered, or rearranged. The process 300 preferably beings after the receiver 110 receives an OFDM symbol 210 via the transmission channel 115. While the process 300 is described as performing time-domain prediction using four pilot symbols, the process 300 can be adapted to use other quantities of pilot symbols (e.g., two) to perform time-domain prediction as described herein.

At stage 305, the receiver 110 receives the signal 125 (e.g., an OFDM DVB-T/H signal which has been transformed into the signal 130) transmitted by the transmitter 105 via the transmission channel 115 and performs initial processing of the signal 125. For each of the OFDM symbol set 210 received by the receiver 110, the S/P converter 170 converts the OFDM symbol set 210 into the parallel signal 172. Each stream (e.g., 172₁ through 172₂₅) corresponds to a different sub-carrier used to transmit the signal 125 via the transmission channel 115. The processor 175 receives the signal 172 from the S/P converter 170. The processor 175 removes the cyclic prefix added by the processor 160. The processor 175 provides the signal 177 to the processor 180. The processor 180 performs an FFT on the signal 177 converting it into the frequency domain signal 182. The processor 182 provides each OFDM symbol set 210 to the processors 185 and 190.

At stage 310, the processor 190 determines whether the receiver 110 should be initialized, or is operating in a steady-state. If it is desired to initialize the receiver 110, the process 300 continues to stage 315, otherwise, the process 300 continues to stage 325.

At stage 315, the processor 190 calculates an initial time-domain channel correlation value. The processor 190 calculates the initial time-domain channel correlation value by determining a time-domain correlation value for all of the sub-carriers that include the continuous pilot symbols 221 (e.g., in an DVB-T/H system, the sub-carriers 0, 48, 54, 87, 141, etc.), which are averaged to calculate a final average time-domain channel correlation value. The processor 190 preferably waits for the first thirteen OFDM symbols 210 to arrive at the receiver 110 before calculating the time-domain correlation value. For each of the sub-carriers that include the continuous pilot symbols 221, the processor 190 uses the first thirteen scattered pilot symbols 221 received by the receiver 110 to calculate the initial time-domain channel correlation. For example, the processor 190 calculates the initial time-domain channel correlation according to Equation (13). The processor 190, however, can also be configured to calculate the initial time-domain correlation value using other sub-carriers as well.

At stage 320, the processor 190 calculates one or more values used to perform time-domain channel prediction. The processor 190 calculates the matrix $R_t$ according to Equation (18) using the initial time-domain channel values and further calculates MMSE filter coefficients using Equation (17).

At stage 325, the processor 190 calculates a steady-state time-domain channel correlation value. The processor 190 calculates the steady-state time-domain channel correlation value by determining a time-domain correlation value for all of the sub-carriers that include the continuous pilot symbols 221, which are averaged to calculate a final time-domain correlation value. The processor 190 preferably uses previously calculated channel estimates that have been stored in a memory. The processor 190 uses Equation (14) to calculate an intermediate time-domain channel correlation value, which is filtered by the processor 190 using Equation (15) to obtain the final steady-state time-domain channel estimate.

At stage 330, the processor 190 calculates one or more values used to perform time-domain channel prediction. The processor 190 calculates the matrix $R_t$ according to Equation (18) using the steady-state time-domain channel values and further calculates MMSE filter coefficients according to Equation (17).

At stage 335, the processor 190 calculates channel estimates that correspond to the sub-carriers that include the scattered pilot symbols 222. The processor 190 calculates the channel estimates using the MMSE filter coefficients calculated during stage 320 and/or 330. The processor 190 calculates channel estimates that correspond to triplets of data symbols using four previously received and consecutive (in time) ones of the scattered pilot symbols 222. For example, the processor 190 calculates channel estimates corresponding to the symbols 14-16 of the sub-carrier 3 using the scattered pilot symbols 1, 5, 9, and 13 of the sub-carrier 3. The processor 190, however, can use other configurations of pilot symbols. The processor 190 calculates the channel estimates according to Equation (16). While stage 335 has been described as using four of the pilot symbols 222 to perform channel estimation, other quantities of pilot symbols can be used. From stage 335, the process 300 continues to stage 340, which is optional. If stage 340 is omitted from the process 300, the process 300 continues to stage 405.

At stage 340, the processor 190 re-estimates the time-domain channel correlation, which can be used to improve the accuracy of the time-domain prediction performed during stage 335. The processor 190 estimates the transmitted signal by performing Equation (24) to obtain $\hat{X}_m(p)$, which is mapped to the modulation constellation (e.g., a 64 QAM constellation) used to modulate the signal 120. The processor 190 searches $\hat{X}_m(p)$ to determine which symbols are pilot symbols that have been affected by the transmission channel 115. The processor 190 replaces the received pilot symbol values with the actual pilot symbol values to obtain $\hat{X}_{m(corr)}(p)$. The processor 190 recalculates the channel estimates according to Equation (25). The recalculated channel estimates can be used by other stages in the process 300 (e.g., stages 325 and 335). From stage 340, the process 300 continues to stage 405.

Figure 5:
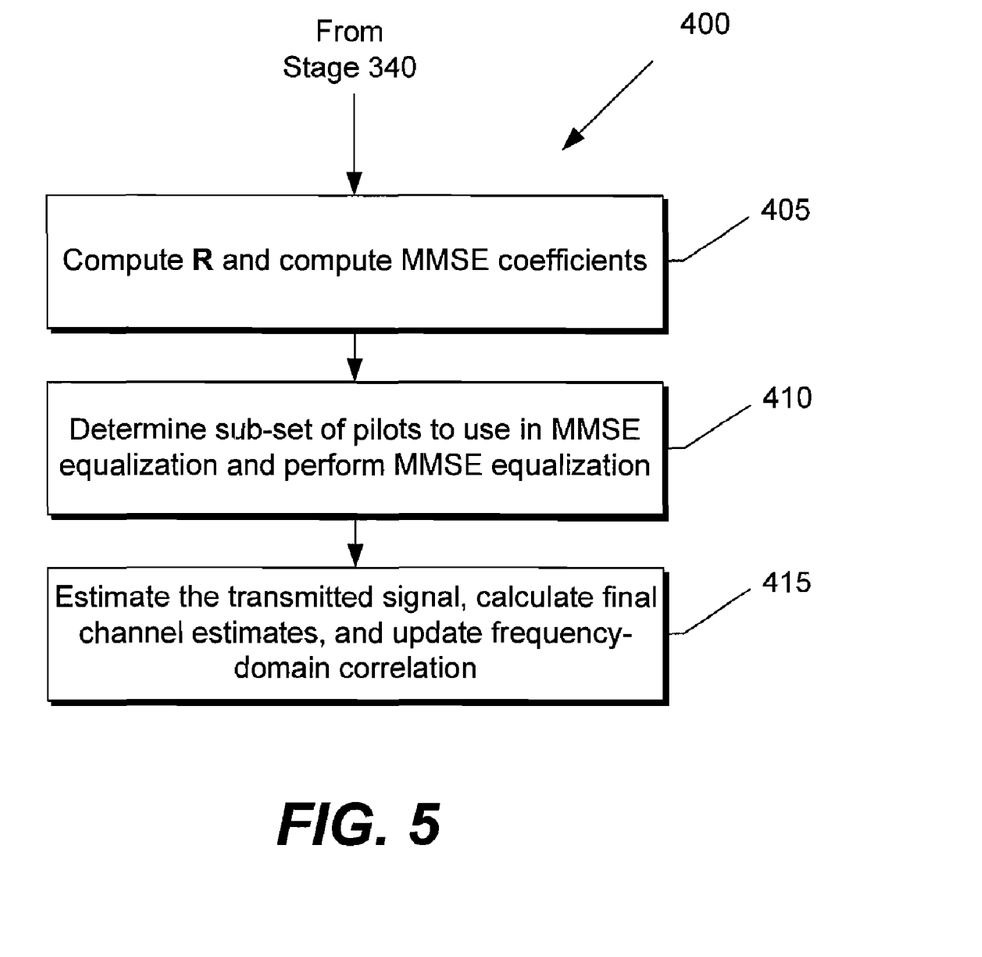
FIG. 5 is a flowchart of a process of frequency domain interpolation using MMSE.

In operation, referring to FIG. 5, with further reference to FIGS. 2-4, a process 400 for frequency domain interpolation using MMSE and the system 100 includes the stages shown. The process 400, however, is exemplary only and not limiting. The process 400 may be altered, e.g., by having stages added, removed, altered, or rearranged. The process 400 assumes that during the process 300, that the processor 190 calculated channel estimates for at least a sub-set of the sub-carriers used to transmit the signal 130 (creating established sub-carriers). For example, the processor 400 assumes that during the process 300, the processor 190 computed channel estimates for each of the sub-carriers that include the scattered pilot symbols 222.

At stage 405, the processor 190 performs initial frequency-domain channel correlation estimation. The processor 190 computes $R_f$ using Equation (29), which corresponds to the specific OFDM symbol set 210 being analyzed. The processor 190 calculates at least two sets of MMSE filter coefficients using Equation (27) (or Equation (31)), each of the MMSE coefficient sets corresponding to a respective location of the data symbols 225 relative to surrounding pilot symbols 220. The processor 190 computes additional MMSE filter coefficients corresponding to sub-carriers near the lowest and highest frequencies used to transmit the signal 125. For the frame 205, depending on the configuration of the scattered pilot symbols 222 in the symbol set 210, the processor 190 calculates four additional coefficients using Equation (27).

At stage 410, the processor 190 determines the sub-set of pilots 220 to be used to calculate the channel estimates of the non-established sub-carriers. For each of the data symbols 225, the processor 190 determines if there are at least two established sub-carriers between the sub-carrier used to transmit the symbol 215 under inspection and the lowest- and highest-frequency sub-carrier used to transmit the signal 125. If there are at least two of the established sub-carriers between the sub-carrier used to transmit the symbol 215 under inspection and the highest- and lowest-frequency sub-carriers, then the processor 190 chooses four pilot symbols 222 to use in MMSE equalization. For example, the processor 190 chooses the two closest of the scattered pilot symbols 222 having a sub-carrier frequency lower than the symbol 215 under inspection, and the two closest of the scattered pilot symbols 222 having a sub-carrier frequency higher than the symbol 215 under inspection. For example, when calculating a channel estimate of the symbol 245, the processor 190 selects the established sub-carriers 246, 247, 248, and 249. If the symbol 215 under inspection has less than two of the established sub-carriers between the sub-carrier used to transmit the symbol under inspection and the lowest- or highest-frequency sub-carrier used to transmit the signal 125, then the processor 190 selects the two established sub-carriers having the closest sub-carrier frequency. For example, when determining which sub-set of established sub-carriers to use when calculating a channel estimate for the symbol 253, the module selects the established sub-carriers 246 and 247. The processor 190 performs MMSE equalization on each of the symbols 215 under inspection using Equation (32) to obtain an initial channel estimate for each sub-carrier under inspection. More or fewer than two established sub-carriers can be used to calculate an estimate of edge channels.

At stage 415, the processor 190 calculates a final channel estimate of the signal 125 using Equation (33) and the initial channel estimates calculated in stage 410. The processor 190 calculates an estimate of the signal 125 using Equation (33). The processor 190 replaces the estimated pilot symbols with the actual pilot symbols in the output of Equation (33). The processor 190 further refines the accuracy of the TPS symbol estimate by averaging all of the TPS symbols in an OFDM symbol set 210 under inspection using Equation (34). The processor 190 computes a final channel estimate of the transmission channel 115 using the estimate of the signal 125 (having substituted pilot and TPS symbols) and Equation (35). The processor 190 computes the updated channel correlation using Equation (36). The processor 190 further calculates the estimated average correlation using Equation (37). The processor 190 outputs the final channel estimates to the processor 185, which processes the signal 130 using the final channel estimates.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

While the above discussion has focused on certain calculations that are performed using sub-carriers that include the scattered pilot symbols 222 and sub-carriers that do not, other configurations are possible. For example, time-domain prediction can be performed on sub-carriers other than those including the scattered pilot symbols 222. Less than all of the sub-carriers that include the scattered pilot symbols 222 may be analyzed during the time-domain prediction phase. The frequency-domain interpolation calculations can be performed using sub-carriers that do not include the scattered pilot symbols 222.

Further, while the description above refers to the invention, the description may include more than one invention.

What is claimed is:

1. A receiver for receiving an orthogonal frequency division multiplexed (OFDM) digital video broadcast (DVB) signal including OFDM symbol sets including data symbols and pilot symbols transmitted using a plurality of sub-carriers, the OFDM DVB signal being transmitted toward the receiver via a transmission channel, the receiver comprising:
- an input processor configured to receive the OFDM DVB signal via the transmission channel and to perform a Fourier transform on the OFDM DVB signal to provide a frequency-domain signal; and
- a channel estimation processor coupled to the input processor and configured to calculate final channel estimates for at least a particular time slot, the channel estimation processor being configured to:
  - perform time-domain prediction on the frequency-domain signal to provide initial channel estimates for particular sub-carriers for the particular time slot using symbols received prior to the particular time slot; and
  - perform minimum mean square error (MMSE) equalization on the frequency-domain signal using the initial channel estimates that correspond to a sub-set of the particular sub-carriers to calculate the final channel estimates,
- wherein the channel estimation processor is configured to select, as the sub-set of particular sub-carriers, N closest particular sub-carriers having frequencies lower than a frequency used to transmit a data symbol under inspection and N closest particular sub-carriers having frequencies higher than a frequency used to transmit the data symbol under inspection.

2. The receiver of claim 1 wherein the channel estimation processor is configured to perform time-domain prediction using MMSE equalization.

3. The receiver of claim 2 wherein the channel estimation processor is configured to calculate MMSE filter coefficients for the time-domain prediction by calculating a time-domain correlation value corresponding to the transmission channel.

4. The receiver of claim 3 wherein the time-domain correlation value is calculated using sub-carriers that include continuous pilot symbols.

5. The receiver of claim 3 wherein the time-domain correlation value is at least one of an initial time-domain correlation value and a steady-state time-domain correlation value.

6. The receiver of claim 1 wherein the particular sub-carriers correspond to sub-carriers that include scattered pilot symbols.

7. The receiver of claim 1 wherein the channel estimation processor calculates a final channel estimate corresponding to each respective sub-carrier used to transmit each of the OFDM symbol sets.

8. A method for computing channel estimates of a transmission channel used to transmit an orthogonal frequency division multiplexed (OFDM) digital video broadcast (DVB) signal including OFDM symbol sets including data symbols and pilot symbols transmitted using a plurality of sub-carriers, the method comprising:
- receiving the OFDM DVB signal at a receiver via a transmission channel;
- performing Fourier transforms on the OFDM DVB signal to provide a frequency-domain signal;
- performing time-domain prediction on the frequency-domain signal to provide initial channel estimates for particular sub-carriers for the particular time slot using symbols received prior to the particular time slot;
- selecting, as a sub-set of particular sub-carriers, N closest particular sub-carriers having frequencies lower than a frequency used to transmit a data symbol under inspection and N closest particular sub-carriers having frequencies higher than a frequency used to transmit the data symbol under inspection; and
- performing minimum mean square error (MMSE) equalization on the frequency-domain signal using the initial channel estimates that correspond to the sub-set of the particular sub-carriers to calculate the final channel estimates.

9. The method of claim 8 comprising performing time-domain prediction using MMSE equalization.

10. The method of claim 9 comprising calculating MMSE filter coefficients for the time-domain prediction by calculating a time-domain correlation value corresponding to the transmission channel.

11. The method of claim 10 wherein calculating the MMSE filter coefficients comprises calculating the MMSE filter coefficients using sub-carriers that include continuous pilot symbols.

12. The method of claim 10 wherein calculating the MMSE filter coefficients comprises calculating at least one of an initial time-domain correlation value and a steady-state time-domain correlation value.

13. The method of claim 8 wherein the particular sub-carriers correspond to sub-carriers that include scattered pilot symbols.

14. The method of claim 8 comprising calculating a final channel estimate corresponding to each respective sub-carrier used to transmit each of the OFDM symbols sets.

15. A method for performing time-domain prediction for use with an orthogonal frequency division multiplexed (OFDM) digital video broadcast (DVB) signal transmitted by a transmitter, the OFDM DVB signal including OFDM symbol sets including data symbols, continuous pilot symbols, and scattered pilot symbols transmitted using a plurality of sub-carriers, the OFDM DVB signal being transmitted via a transmission channel, the method comprising:
- receiving the OFDM DVB signal which has been affected by the transmission channel;
- performing Fourier transforms on the OFDM DVB signal to provide a frequency-domain signal;
- computing an averaged time-domain correlation value that corresponds to the transmission channel using a plurality of the continuous pilot symbols included in the frequency domain signal;
- computing minimum mean square error (MMSE) filter coefficients using the averaged time-domain correlation value; and
- performing MMSE equalization using the filter coefficients to calculate channel estimates corresponding to a sub-set of the sub-carriers, wherein the sub-set of the sub-carriers includes each of the sub-carriers that include the scattered pilot symbols.

16. The method of claim 15 wherein computing the averaged time-domain correlation value comprises calculating a time-domain correlation value that corresponds to each sub-carrier, which include the continuous pilot symbols, used to transmit each of the OFDM symbols sets.

17. The method of claim 15 further comprising:
- estimating the OFDM DVB signal transmitted by the transmitter to provide an estimated signal; and
- recalculating the averaged time-domain correlation value using the estimated signal.

18. An apparatus for computing channel estimates of a transmission channel used to transmit an orthogonal frequency division multiplexed (OFDM) digital video broadcast (DVB) signal including OFDM symbol sets including data symbols and pilot symbols transmitted using a plurality of sub-carriers, the apparatus comprising:
- means for receiving the OFDM DVB signal at a receiver via a transmission channel;

means for performing Fourier transforms on the OFDM DVB signal to provide a frequency-domain signal;

means for performing time-domain prediction on the frequency-domain signal to provide initial channel estimates for particular sub-carriers for the particular time slot using symbols received prior to the particular time slot;

means for selecting, as a sub-set of particular sub-carriers, N closest particular sub-carriers having frequencies lower than a frequency used to transmit a data symbol under inspection and N closest particular sub-carriers having frequencies higher than a frequency used to transmit the data symbol under inspection; and means for performing minimum mean square error (MMSE) equalization on the frequency-domain signal using the initial channel estimates that correspond to the sub-set of the particular sub-carriers to calculate the final channel estimates.

19. The apparatus of claim 18 comprising means for performing time-domain prediction using MMSE equalization.

20. The apparatus of claim 19 comprising means for calculating MMSE filter coefficients for the time-domain prediction by calculating a time-domain correlation value corresponding to the transmission channel.

21. The apparatus of claim 20 wherein the means for calculating the MMSE filter coefficients comprises means for calculating the MMSE filter coefficients using sub-carriers that include continuous pilot symbols.

22. The apparatus of claim 20 wherein the means for calculating the MMSE filter coefficients comprises means for calculating at least one of an initial time-domain correlation value and a steady-state time-domain correlation value.

23. The apparatus of claim 18 wherein the particular sub-carriers correspond to sub-carriers that include scattered pilot symbols.

24. The apparatus of claim 18 comprising means for calculating a final channel estimate corresponding to each respective sub-carrier used to transmit each of the OFDM symbols sets.

25. A non-transitory computer-readable medium having instructions encoded thereon which, when executed by a processor, cause an apparatus to perform a method of computing channel estimates of a transmission channel used to transmit an orthogonal frequency division multiplexed (OFDM) digital video broadcast (DVB) signal including OFDM symbol sets including data symbols and pilot symbols transmitted using a plurality of sub-carriers, the method comprising:

receiving the OFDM DVB signal at a receiver via a transmission channel;

performing Fourier transforms on the OFDM DVB signal to provide a frequency-domain signal;

performing time-domain prediction on the frequency-domain signal to provide initial channel estimates for particular sub-carriers for the particular time slot using symbols received prior to the particular time slot;

selecting, as a sub-set of particular sub-carriers, N closest particular sub-carriers having frequencies lower than a frequency used to transmit a data symbol under inspection and N closest particular sub-carriers having frequencies higher than a frequency used to transmit the data symbol under inspection; and performing minimum mean square error (MMSE) equalization on the frequency-domain signal using the initial channel estimates that correspond to the sub-set of the particular sub-carriers to calculate the final channel estimates.

26. The non-transitory computer-readable medium of claim 25 wherein the method comprises performing time-domain prediction using MMSE equalization.

27. The non-transitory computer-readable medium of claim 26 wherein the method comprises calculating MMSE filter coefficients for the time-domain prediction by calculating a time-domain correlation value corresponding to the transmission channel.

28. The non-transitory computer-readable medium of claim 27 wherein calculating the MMSE filter coefficients comprises calculating the MMSE filter coefficients using sub-carriers that include continuous pilot symbols.

29. The non-transitory computer-readable medium of claim 27 wherein calculating the MMSE filter coefficients comprises calculating at least one of an initial time-domain correlation value and a steady-state time-domain correlation value.

30. The non-transitory computer-readable medium of claim 25 wherein the particular sub-carriers correspond to sub-carriers that include scattered pilot symbols.

31. The non-transitory computer-readable medium of claim 25 wherein the method comprises calculating a final channel estimate corresponding to each respective sub-carrier used to transmit each of the OFDM symbols sets.

32. An apparatus for performing time-domain prediction for use with an orthogonal frequency division multiplexed (OFDM) digital video broadcast (DVB) signal transmitted by a transmitter, the OFDM DVB signal including OFDM symbol sets including data symbols, continuous pilot symbols, and scattered pilot symbols transmitted using a plurality of sub-carriers, the OFDM DVB signal being transmitted via a transmission channel, the apparatus comprising:

means for receiving the OFDM DVB signal which has been affected by the transmission channel;

means for performing Fourier transforms on the OFDM DVB signal to provide a frequency-domain signal;

means for computing an averaged time-domain correlation value that corresponds to the transmission channel using a plurality of the continuous pilot symbols included in the frequency domain signal;

means for computing minimum mean square error (MMSE) filter coefficients using the averaged time-domain correlation value; and means for performing MMSE equalization using the filter coefficients to calculate channel estimates corresponding to a sub-set of the sub-carriers, wherein the sub-set of the sub-carriers includes each of the sub-carriers that include the scattered pilot symbols.

33. The apparatus of claim 32 wherein the means for computing the averaged time-domain correlation value comprises means for calculating a time-domain correlation value that corresponds to each sub-carrier, which include the continuous pilot symbols, used to transmit each of the OFDM symbols sets.

34. The apparatus of claim 32 further comprising:

means for estimating the OFDM DVB signal transmitted by the transmitter to provide an estimated signal; and means for recalculating the averaged time-domain correlation value using the estimated signal.

35. A non-transitory computer-readable medium having instructions encoded thereon which, when executed by a processor, cause an apparatus to perform a method of performing time-domain prediction for use with an orthogonal frequency division multiplexed (OFDM) digital video broadcast (DVB) signal transmitted by a transmitter, the OFDM DVB signal including OFDM symbol sets including data symbols, continuous pilot symbols, and scattered pilot symbols transmitted using a plurality of sub-carriers, the OFDM DVB signal being transmitted via a transmission channel, the method comprising:
- receiving the OFDM DVB signal which has been affected by the transmission channel;
- performing Fourier transforms on the OFDM DVB signal to provide a frequency-domain signal;
- computing an averaged time-domain correlation value that corresponds to the transmission channel using a plurality of the continuous pilot symbols included in the frequency domain signal;
- computing minimum mean square error (MMSE) filter coefficients using the averaged time-domain correlation value; and
- performing MMSE equalization using the filter coefficients to calculate channel estimates corresponding to a sub-set of the sub-carriers, wherein the sub-set of the sub-carriers includes each of the sub-carriers that include the scattered pilot symbols.

36. The non-transitory computer-readable medium of claim 35 wherein computing the averaged time-domain correlation value comprises calculating a time-domain correlation value that corresponds to each sub-carrier, which include the continuous pilot symbols, used to transmit each of the OFDM symbols sets.

37. The non-transitory computer-readable medium of claim 35 wherein the method further comprises:
- estimating the OFDM DVB signal transmitted by the transmitter to provide an estimated signal; and
- recalculating the averaged time-domain correlation value using the estimated signal.

38. A receiver for receiving an orthogonal frequency division multiplexed (OFDM) digital video broadcast (DVB) signal transmitted by a transmitter, the OFDM DVB signal including OFDM symbol sets including data symbols, continuous pilot symbols, and scattered pilot symbols transmitted using a plurality of sub-carriers, the OFDM DVB signal being transmitted via a transmission channel, the receiver comprising:
- an input processor configured to receive the OFDM DVB signal which has been affected by the transmission channel and to perform a Fourier transform on the OFDM DVB signal to provide a frequency-domain signal; and
- a channel estimation processor coupled to the input processor and configured to calculate channel estimates, the channel estimation processor being configured to:
  - compute an averaged time-domain correlation value that corresponds to the transmission channel using a plurality of the continuous pilot symbols included in the frequency domain signal;
  - compute minimum mean square error (MMSE) filter coefficients using the averaged time-domain correlation value; and
  - perform MMSE equalization using the filter coefficients to calculate channel estimates corresponding to a sub-set of the sub-carriers, wherein the sub-set of the sub-carriers includes each of the sub-carriers that include the scattered pilot symbols.

39. The receiver of claim 38 wherein computing the averaged time-domain correlation value comprises calculating a time-domain correlation value that corresponds to each sub-carrier, which include the continuous pilot symbols, used to transmit each of the OFDM symbols sets.

40. The receiver of claim 38 further comprising a signal estimation processor coupled to the input processor and the channel estimation processor and configured to estimate the OFDM DVB signal transmitted by the transmitter to provide an estimated signal and wherein the channel estimation processor recalculates the averaged time-domain correlation value using the estimated signal.

* * * * *